(12) United States Patent
Wilson

(10) Patent No.: US 6,893,074 B1
(45) Date of Patent: May 17, 2005

(54) MOBILE VEHICLE HAIL COVER

(75) Inventor: Timothy David Wilson, Dallas, TX (US)

(73) Assignee: Timothy D. Wilson, Dallas, TX (US)

( * ) Notice: Subject to any disclaimer, the term of this patent is extended or adjusted under 35 U.S.C. 154(b) by 0 days.

(21) Appl. No.: 10/708,654

(22) Filed: Mar. 17, 2004

(51) Int. Cl.$^7$ .................................................. B62D 25/08
(52) U.S. Cl. ................................. 296/136.02; 150/165
(58) Field of Search .................... 296/95.1, 98, 136.02; 150/166, 165

(56) References Cited

U.S. PATENT DOCUMENTS

| | | | | |
|---|---|---|---|---|
| 4,531,560 A | * | 7/1985 | Balanky | 150/166 |
| 4,925,234 A | * | 5/1990 | Park et al. | 296/136.13 |
| 4,948,191 A | * | 8/1990 | Cao | 296/95.1 |
| 5,029,933 A | * | 7/1991 | Gillem | 150/166 |
| 5,042,836 A | * | 8/1991 | Swanson | 296/136.02 |
| 5,102,183 A | * | 4/1992 | Swartz | 296/95.1 |
| 5,209,545 A | * | 5/1993 | Slaugh | 150/166 |
| 5,401,074 A | * | 3/1995 | Timerman | 296/136.02 |
| 5,414,966 A | * | 5/1995 | Montoya | 135/116 |
| 5,605,369 A | * | 2/1997 | Ruiz | 150/166 |
| 5,800,006 A | * | 9/1998 | Pettigrew | 150/166 |
| 5,820,196 A | * | 10/1998 | Rudys et al. | 150/166 |
| 6,273,493 B1 | * | 8/2001 | Woo | 150/166 |
| 6,371,547 B1 | * | 4/2002 | Halbrook | 150/166 |
| 6,491,335 B1 | * | 12/2002 | Cohill | 150/166 |
| 6,513,858 B1 | * | 2/2003 | Li et al. | 296/98 |
| 6,588,827 B2 | * | 7/2003 | Heiland | 150/166 |

* cited by examiner

*Primary Examiner*—Lori L. Coletta

(57) ABSTRACT

The Mobile Vehicle Hail Cover can provide a protective barrier for the top surfaces of a motor vehicle, from the damaging effects of falling hail, during a sudden hail storm, while the vehicle is under operation on the roadways, providing completely street legal operation, or when parked. The invention consists of 2 to 3 composite protective cover sheets of flexible rubberized and weatherproof material. The cover sheet for the roof, is connected to the sheets on the hood and trunk by way of elastic straps. The Hood and Trunk sheets are attached to the vehicle by the elastic straps at each corner, connecting to rubber coated metal hooks on the ends, to securely anchor the entire apparatus to the vehicle. This invention, can help automobile Insurance companies, realize the savings of Billions $$ in hail damage claims and prevent potential freeway accident pileups, due to drivers stopping under bridges & freeway overpasses.

1 Claim, 4 Drawing Sheets

MOBILE VEHICLE HAIL COVER

BACKGROUND OF INVENTION

1. Field of Invention

This Invention relates to the Prevention of damage to Motor Vehicles, specifically resulting from falling Hail, due to a sudden Hail Storm. This invention provides protection while allowing mobility and operation of the motor vehicle on streets and highways.

2. Prior Art

The previous types of protective car covers as mentioned in the patents Numbered: U.S. Pat. No. 6,513,858 (2003); U.S. Pat. No. 5,800,006 (1998); U.S. Pat. No. 5,414,966 (1995); U.S. Pat. No. 5,401,074 (1995); U.S. Pat. No. 5,029,933 (1991); U.S. Pat. No. 4,948,191 (1990); U.S. Pat. No. 4,925,234 (1990), have glaring deficiencies. Of these, only a few are intended to protect the vehicle from falling objects of any kind, U.S. Pat. Nos. 4,948,191, 5,800,006, and 5,401,074. All have the same major drawback, in that they can only be used for a vehicle that is stationary or parked. They can not be used while the vehicle is in operation. They all obstruct the view thru the windshield and the rear window of the vehicle. They also either block and/or cover the head lights, tail lights, and signal lights of the vehicle that they are installed on.

Most Hail Storms frequently occur at a time when a vehicle is in operation, or in transit on a public Highway, roadway, or street, while the Driver is in route to or from work, the store, or traveling from one place to another. My invention will allow the motor vehicles' driver or operator, to stop and pause while in transit. Then remove the "Mobile Vehicle Hail Cover" from the vehicles' trunk or storage compartment, and quickly deploy it in the protection of the vehicle from falling hail. She or he, can then leave it in place, while they continue in transit, on their journey to their destination.

None of the other prior arts allow for operation of the motor vehicle while the car cover is in place, or in use. All of the other car covers, that are intended to provide any type of protection from any type of falling objects, completely cover the vehicle, obstructing and blocking some, or all, of the windows, mirrors, turn signal lights, brake lights, or head lights. And they can only be used when the car is parked, and not being operated. This restricts or eliminates vehicle mobility.

OBJECTS AND ADVANTAGES

There are several objects and advantages of my Invention, which begin with the main function and structure of the preferred embodiment, FIG. 1. The first of which is intended to provide a protective barrier between the top surfaces of the vehicle and any falling hail such as encountered during a hail storm. It does this while allowing for full mobility and legal operation of the motor vehicle. FIGS. 5 & 6 show the surfaces protected include the hood 24a, roof 24b, and trunk 24c, for an automobile or car. The hood & trunk surfaces only, are protected, for a convertible automobile, a Sport Utility vehicle, a Van, or Pickup truck.

Other advantages of the invention are, that it provides this protection while allowing a full field of unobstructed vision through all of the vehicles' windows. This includes the front windshield, the rear window, and all side windows. The side view and rear view mirrors are also unobstructed, allowing the driver a clear field of vision thru any or all of the mirrors at any time during the operation of the motor vehicle.

Additional advantages of the invention are, that while it is in place, deployed on the vehicle in question for hail protection, all of the vehicles turn signal lights, brake lights, and head lights, are clearly visible and unobstructed. This allows completely safe and legal operation of the motor vehicle, while driving it during a Hail Storm, when the invention ("Mobile Vehicle Hail Cover") is in place.

The invention is very practical for use when a sudden hail storm occurs, both while in transit and when the vehicle is parked in a stationary position, since it can be put in place on the vehicle in less than 2-minutes. This is due in part to it's unique and simple construction. The invention can be installed, both quickly and easily, by anyone who is not mechanically inclined or mechanically experienced, in just 4 simple steps.

First, remove the invention from the stored location in the vehicle. Second, place each of the individual composite protective covering sheets for the trunk 24c, roof 24b, and hood 24a, on top of the vehicle. Third, hook the four connecting elastic straps 18 via the rubber coated metal hooks 20 to the bumper or grill or any convenient location you choose, for the cover sheet on the hood 24a of the vehicle. Fourth, repeat the procedure just performed at the rear of the car, for the trunk or rear covering sheet. That's all there is to the installation for the Mobile Vehicle Hail Cover invention.

If the user desires they may open the trunk lid and place any overlapping material under the trunk lid while closing the trunk. Then open the hood just enough to repeat the procedure just performed at the rear of the car, for the front covering sheet. This will further secure the unit to the vehicle, and help prevent it's theft while in place. Further objects and advantages of my invention will become apparent from a consideration of the drawings & ensuing description.

SUMMARY OF INVENTION

This invention provides protection from falling hail, for an automobile, while giving full mobility and operation of the motor vehicle, and allowing for a full field of unobstructed vision through all of the vehicles' windows. This includes the front windshield, the rear window, and all side windows. All side view and rear view mirrors are also unobstructed, allowing the driver a clear field of vision thru any or all of them at any time during the operation of the motor vehicle. In addition, none of the vehicles' lights, such as head lights, tail lights, turn signal or brake lights, are obstructed.

BRIEF DESCRIPTION OF DRAWINGS

Figures

Figure 2:
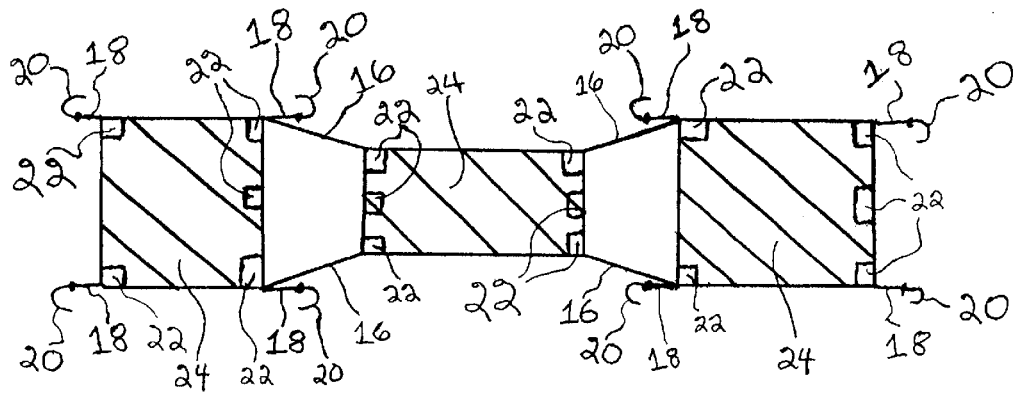
FIG. 2 shows a Bottom View of the Invention with the magnets placement.

REFERENCE NUMERALS 10 suede cloth/chamois top sheet 12 flexible neoprene rubber sheet 14 light density foam rubber sheet 16 elastic straps—sheet connectors
18 elastic straps—hook connectors 20 rubber-coated metal hooks
22 rubberized magnets 24a, 24b, and 24c composite cover sheets
26 loop hole of elastic strap 28 hook catch loop

DETAILED DESCRIPTION

Figure 1:
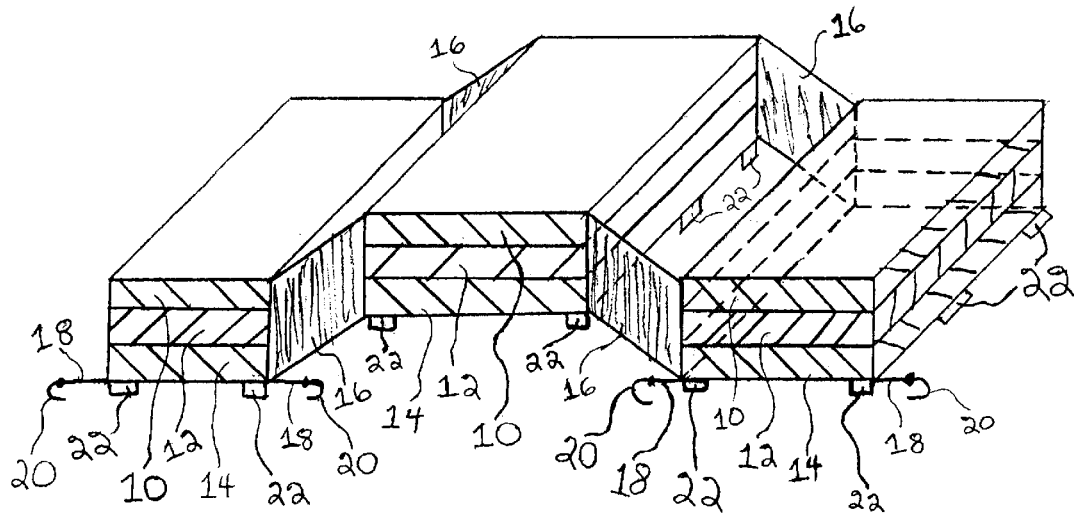
FIG. 1 shows an Isometric view of the Mobile Vehicle Hail Cover.

Preferred Embodiment—FIG. 1

The structure of the Preferred Embodiment, for the Mobile Hail Cover Invention is shown in FIG. 1, and consists of three composite protective cover sheets 24a, 24b, and 24c, that are placed on the top surface of the hood, roof, and trunk, of a motor vehicle.

The Preferred Embodiment can provide protection from falling hail objects of up to approximately golf ball sized hail. The structure consists of 1-sheet of thin flexible neoprene rubber 12, glued or bonded, to a sheet of thin light density, non-memory foam rubber 14, which is the bottom protective sheet. The top sheet is made of chamois leather or suede cloth 10, and is used simply to provide aesthetic value and a small bit of protection for the top rubber sheet 12, from the elements and debris, while the invention is in place on the vehicle, and the vehicle is in motion, traveling down the roadway. The top sheet 10 will help weight down the composite sheets to the vehicle, when it gets wet, further reducing flapping from the wind.

The invention construction, uses this novel structure, to minimize the localized impact energy of each hail object. It will disperse the impact energy, which is transmitted from the top protective sheet 12, thru the 2nd protective sheet 14, to a wider surface area. This reduces the chance of denting the vehicle body.

The thickness of both the flexible rubber sheet 12, and the non-memory foam rubber sheet 14 each, should be kept to between about ¼" inch-and-⅜" inch. The combined thickness of any composite cover sheets 24a, 24b and 24c should be kept to approximately ⅝" to about ¾" of an inch. This is to maintain the portability and ease of both storage, and deployment or installation, of the invention on the motor vehicle. This overall thickness will provide the type of protection mentioned above, of up to approximately, golf ball sized hail.

The top sheet 10 which consists of chamois or velvet suede cloth or thin premium leather covering, is available in various solid colors, depending on what the customer desires. These colors can be Red, Blue, Black, White, Gray or Silver, Smoke Silver or Champagne, Yellow, and Green. Design images can be drawn on the top of the upper side of the suede cloth or chamois sheet covering the top of the invention. This image can be something like the symbol of the car that the Mobile Vehicle Hail Cover is installed on. For example the 3-pointed Star symbol for Mercedes Benz, or the Horse symbol for a Ferrari automobile, or the Ford, Dodge, or Chevrolet emblems. All rights of these trademarked symbols observed and preserved.

The image may also be of a design selected by the owner, from a database of a number of possible images. These images can be made available to each customer at the time of their ordering the "Mobile Vehicle Hail Cover" invention.

The composite protective cover sheet, which consists of the 3-sheets 10, 12, and 14 glued or bonded together, will comprise one protective covering sheet for each of the three surfaces of the particular vehicle. These surfaces are the Hood, the Roof, and the Trunk surface of the vehicle. If the vehicle is an automobile, then the hood, roof, and trunk will have a protective cover. The hood, and roof are the only surfaces having protective covers for Pickup Truck's, Van's and Sport Utility type vehicle's or SUV's.

Figure 6:
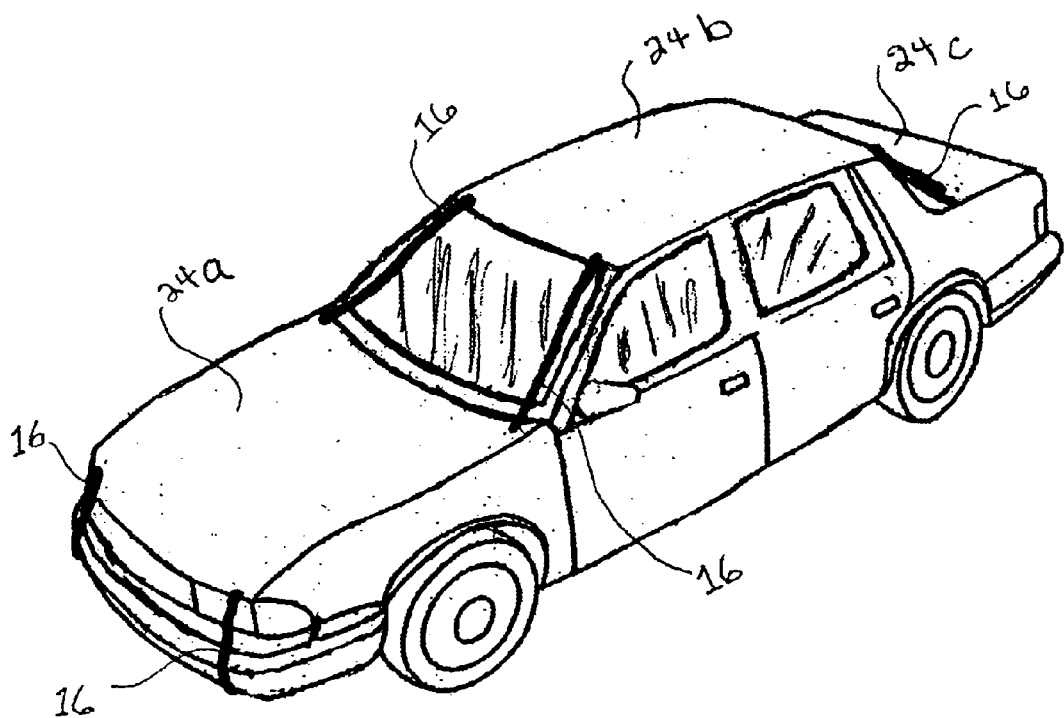
FIGS. 5 & 6 shows the invention installed on a car, in two different angles.
Figure 5:
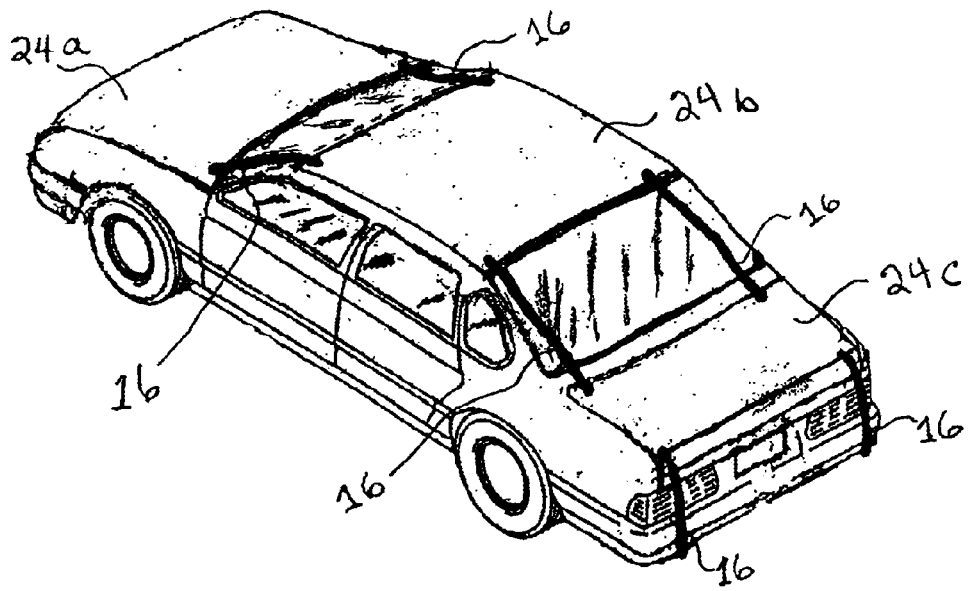

As illustrated in FIGS. 5 & 6, each of the composite protective cover sheets 24a, 24b, and 24c which are comprised of, or constructed from, the three individual, suede 10, rubber 12, and foam rubber 14 sheets, which are glued or bonded together, are connected to each other by the elastic straps 16. The composite sheet that covers and protects the hood 24a, and trunk 24c, of an automobile, are anchored to the vehicle by four elastic straps 18, which connect to the rubber coated metal hooks 20 at the four corners, of both the hood surface, and the trunk surface.

The composite protective cover sheet on the roof 24, is connected to the composite cover sheets on the hood 24a, and trunk 24c, by the elastic straps 16 that run along the "A"-Pillars of the windshield and the rear window. This makes the entire structure 1-solid unit, and allows driving the vehicle while the invention is installed.

Figure 7:
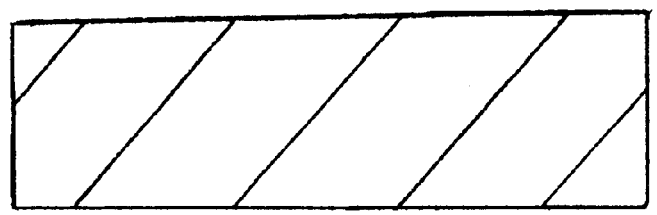
FIGS. 7 & 8 shows the elastic straps, top and side views.
Figure 8:
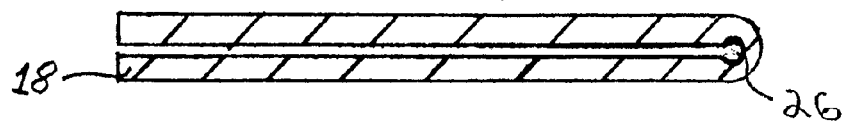
Figure 9:
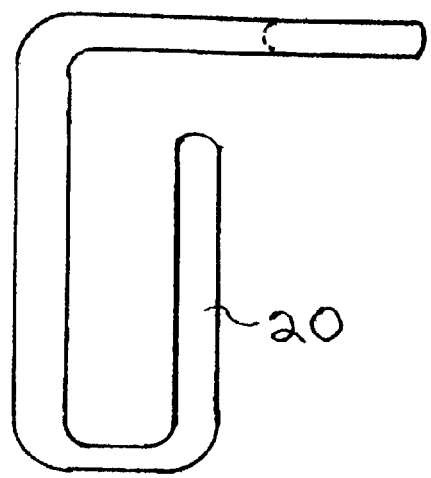
FIGS. 9 & 10 shows the rubber coated metal hook, top and side views.

FIGS. 7 & 8 show how the elastic strap 18 is folded over and stitched or bonded together, leaving a loop hole 26 on one end. FIGS. 1 & 2 show, that 1-elastic strap 18 is connected or bonded to each of the four corners of the composite protective sheet that covers the hood 24, and each of the four corners of the composite protective sheet that covers the trunk 24. The other end of the elastic strap 18 is connected to a rubber coated metal hook 20. The elastic strap 18 is attached to the metal hook 20 by slipping the looped end of the metal hook thru the loop hole 26 in the elastic strap. Refer to FIGS. 8 & 9.

Figure 10:
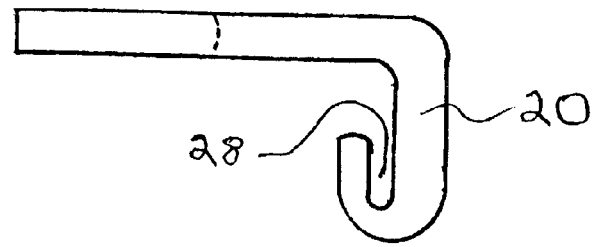

Each of these elastic straps 18, are connected to the car by a rubber coated metal hook 20. These metal hooks can be attached to any convenient location on the vehicle body, via the hook loop 28 as in FIG. 10, to secure the Mobile Vehicle Hail Cover to the vehicle. These are usually connected to the underside of the hood and trunk lids. After the lids are closed on the elastic straps, the invention is further anchored to the vehicle. However, the metal hooks are rubber coated to allow them to be connected to the bumper, grill, or any other location on the vehicle body that the user chooses, without opening the hood or trunk, and without scaring the vehicle body parts.

Rubberized magnets 22, are used to hold the composite protective cover sheets 24a, 24b, and 24c down flat on the vehicle body, and prevent flapping from the wind, while the vehicle is in motion. These magnets 22, are like those of refrigerator magnets, in the size, shape, thickness and gauss or magnetic force. They are glued or bonded to the bottom of each of the composite protective cover sheets 24, as in FIG. 2. These magnets 22 are approximately the same shape, size, and thickness, of a business card, or credit card.

The manufacturing methods for the invention can be performed in an automated and computerized manner. Since the surface area of the sheets for the Hood, Roof, and Trunk area's will vary between different Cars, Pickup Truck's, Van's and Sport Utility vehicle's, a computerized database for the individual hood, roof, and trunk, surface area size & contour, for any number of specific vehicle types can be maintained.

These dimensions and surface contours, for different vehicle types, of a given year, make, and model, can be utilized upon a specific customer order of the Mobile Vehicle Hail Cover Invention, for his or her specific automobile type. Once the type and year of the vehicle is known, the database is searched for the Hood, Roof, and if needed, the Trunk, surface area sizes and contours, for that particular vehicle.

That information is then used to cut the individual suede 10, rubber 12, and foam rubber 14 sheets, to the correct size, and surface area contour. The three sheets are then glued or bonded together, one on top of another as in FIG. 1, using a type of glue, adhesive, or bonding method, such that when it dries or cures, will remain flexible, or non-brittle. This type of glue, adhesive, or bonding method, should also be water resistant or non-soluble, so that the sheets will remain glued or bonded together, in spite of the rainy and windy weather conditions that the Mobile Vehicle Hail Cover invention will operate in.

Note also that said sheets can be first bonded together, and then second, cut to the size & shape needed to facilitate ease of production. And since a range of various vehicle's will have similar dimensions, certain size's and contours of the composite protective cover sheets 24a, 24b and 24c, will fit a number of different vehicle's, and vehicle types.

The glue, adhesive, or bonding method, must remain non-brittle or flexible when cured, so that it will allow the covering sheets of the invention, to be folded, or rolled up. This facilitates making the invention more compact, to be able to store the mobile vehicle hail cover invention in the trunk, or storage compartment of the vehicle.

Heat & pressure bonding techniques, as well as other more state-of-the-art adhesive or bonding techniques, may be used instead of traditional 'glue' or adhesive's, for bonding the individual sheets 10, 12, 14, together, to form the composite protective cover sheets 24.

Operation of Preferred Embodiment—FIG. 1

The function of the individual components for the invention are as follows, referring to FIG. 1, the rubber coated metal hooks 20, connect and secure the protective cover sheets 24a, 24b and 24c to the vehicle, via the elastic straps 18. The elastic straps 18 connect to both the rubber coated metal hooks 20 and the composite protective cover sheet 24. Said elastic straps 18 are stretchable, and are used to connect the composite protective cover sheet 24 to the metal hooks 20 for attaching the cover sheets 24 to the vehicle.

FIGS. 5 & 6 show that the elastic straps 16 are used to connect the cover sheets on the roof 24 and hood 24a together, and also used to connect the cover sheets on the roof 24b and trunk 24c together. This has the effect of making the segmented apparatus 1-solid inter-connected structure.

The composite protective cover sheets 24a, 24b and 24c which are comprised of the individual chamois leather or suede cloth sheet 10, flexible neoprene rubber sheet 12, and foam rubber sheet 14, are used to provide the impact diffusing barrier between the falling hail particles, and the top surfaces of the vehicle body.

Said invention is intended for use when a sudden hail storm occurs, both while in transit and when the vehicle is parked in a stationary position. It can be put in place on the vehicle in less than 2-minutes. This is due in part to it's unique and simple construction. The invention can be installed, both quickly and easily, by anyone who is not mechanically inclined or mechanically experienced, in just 4 simple steps.

First, remove the invention from the stored location in the vehicle. Second, place each of the individual composite protective cover sheets for the trunk 24c, roof 24b, and hood 24a, on top of the vehicle. Third, hook the connecting elastic straps 18, via the rubber coated metal hooks 20, to the bumper or grill or any convenient location you choose, for the composite protective cover sheet on the hood 24 of the vehicle. Fourth, repeat the procedure just performed at the rear of the car, for the trunk or rear covering sheet. That's all there is to the installation for the Mobile Vehicle Hail Cover invention.

Now, if the user desires, they may open the trunk lid and place any overlapping material under the trunk lid while closing the trunk. Then open the hood just enough to repeat the procedure just performed at the rear of the car, for the front covering sheet. This will further secure the unit to the vehicle, and help prevent it's theft while in place.

Now with the rubber coated metal hooks 20, the user can connect them to any place on the vehicle body, such as under the front and rear bumpers or the front grill, without opening the trunk or hood of the vehicle. These rubber coated metal hooks 20 eliminate the possibility of scaring the vehicle body, while firmly securing the invention to the automobile.

Once the "Mobile Vehicle Hail Cover" invention is put in place on the vehicle, the driver is free to continue driving on their way, completely street legal.

Figure 4:
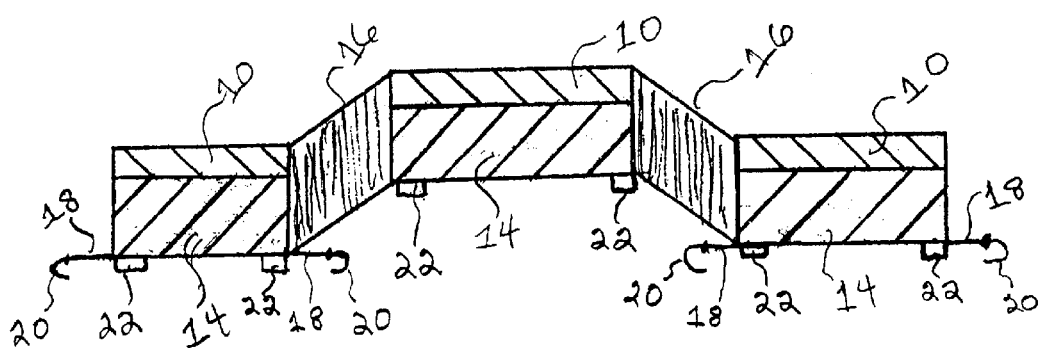
FIGS. 3 & 4 shows the 1st and 2nd alternative embodiments, side views.
Figure 3:
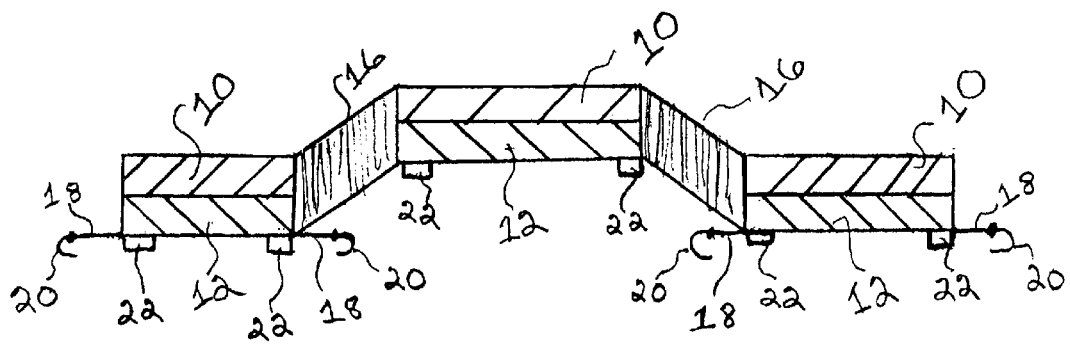

Description—Additional Embodiments—FIGS. 3, and 4

The first alternative embodiment in FIG. 3 can provide protection of approximately, up to marble sized hail. The structure consists of 1-sheet of thin flexible neoprene rubber 12, glued or bonded to the top sheet of velvet suede leather cloth 10. This top sheet 10 is used simply to provide aesthetic value, and a small bit of protection for the top rubber sheet 12, from the elements, and debris, while the invention is in place on the vehicle, and the vehicle is in motion, traveling down the roadway.

The second alternative embodiment (FIG. 4) can provide protection of approximately, up to somewhere between marble size and golf ball sized hail. The structure consists of 1-sheet of non-memory foam rubber 14, bonded to the top sheet of velvet suede leather cloth 10.

Both alternative embodiments have the same interconnecting structure as the preferred embodiment. The composite protective cover sheet for the roof 24b connects via the elastic straps 16 to the protective cover sheets on the hood 24a and the trunk 24c. The hood and trunk cover sheets 24a, 24b and 24c are connected to the vehicle via the elastic straps 18 which connect to the rubber coated metal hooks 20 that attach to the motor vehicle.

Operation—Additional Embodiments

The functional operation of the alternative embodiment's components are the same as that for the preferred embodiment. However, the preferred embodiment construction, will provide maximum protection from the largest falling hail particles. Both alternate embodiments provide protection from slightly smaller falling hail objects, than that which can be provided by the preferred embodiment.

ADVANTAGES

From the description above, a number of advantages of my invention become evident:

(a) The rubber coated metal hooks can be hooked to any convenient place on the vehicle body the user chooses, without scaring or damaging the vehicle.
(b) No need to open the trunk or hood to firmly secure the invention's straps & hooks to the vehicle, though doing so will help prevent theft of the unit, while installed.

(c) The top suede leather or chamois sheet absorbs rain water to increase the weight of the composite cover sheets, to help 'plant' the protective cover sheet to vehicle.

(d) The ergonomic efficiency, or ease-of-use, is very high, allowing anyone to install the unit, quickly and easily.

(e) It uses colors of the users choice, for the top sheet, which can closely match, the users vehicle color.

(f) It provides the user with a safe means of protecting his or her vehicle from falling hail damage, while they are in transit, or stationary.

(g) The completely legal & safe use of the invention, while operating a motor vehicle.

(h) Production of the invention is un-complex, due to it's unique & simple construction, materials, and design.

Conclusion, Ramifications, and Scope

Accordingly, the reader will see that the Mobile Vehicle Hail Cover invention is unique, in both it's construction and the function it performs, by protecting a moving vehicle from the damaging effects of falling hail, while allowing the safe and legal operation of the moving vehicle. Said invention performs this function, while not obstructing the drivers vision, thru any of the vehicles' windows or mirrors. And in addition, all of the vehicle head lights, tail-lights and signal lights are clearly visible and unblocked by the invention, while it is installed on any type of vehicle. Furthermore, the invention has the additional advantages in that:

it permits alternate adhesives or bonding methods for composite sheet construction, other than glue, for bonding the sheets together, such as heat & pressure bonding techniques as just one example of many different bonding methods;

it permits the use of various impact absorbing, hybrid materials, other than just rubber, or foam rubber, e.g., such as air-filled or air-cushion materials;

it permits the use of various colors & images for the top sheet, which adds a pleasing aesthetic value when the invention is in place;

it protects against mold or moisture damage to all protective cover sheet fabrics, by using materials that do not absorb water or moisture, save the top suede leather sheet;

it allows the use of a single cover sheet for each surface rather than a composite sheet construction;

it allows for various securing and anchoring methods to the vehicle;

it allows for the savings of Billions of $$ by the auto insurance industry, in automobile hail damage claims;

it provides a robust and strong structural integrity, by connecting all cover sheets together by the elastic straps along the A-pillars for the front and rear windows;

it provides drivers with peace of mind, knowing they have another option to prevent hail damage to their vehicle when in transit, other than stopping under bridges, in the middle of traffic flow, on highways and freeways; and it provides improved traffic safety, and reduced risks from potential traffic accidents or pile-ups, during a hail storm.

Although the description above contains many specificities, these should not be construed as limiting the scope of the invention, but as merely providing illustrations of some of the presently preferred embodiments of this invention. For example, an additional suede leather or chamois sheet can be bonded to the underside of the bottom protective cover sheet; the suede leather or chamois sheet could be eliminated altogether; a single impact absorbing protective cover sheet alone, for each surface, could be used, etc.

Thus the scope of the invention should be determined by the appended claims and their legal equivalents, rather than by the examples given.

I claim:

1. A Mobile Vehicle Hail Cover, can provide a protective barrier for top surfaces of a motor vehicle, from the damaging effects of falling hail, during a sudden hail storm, said hail cover, can provide this protection when the vehicle is moving, and under operation on the roadways, the mobile vehicle hail cover comprising:

(a) individual protective cover sheets, which are placed on top of the hood, the roof, and the trunk, of an automobile, van, sport utility vehicle, and pickup truck, consisting of an impact absorbing material, sufficient to absorb and disperse the kinetic energy from falling hail objects, thus preventing body damage;

(b) means to physically hold said hail protective cover sheets firmly on the vehicle, while the vehicle is in motion, said cover sheets may all be interconnected to each other via elastic straps, forming one solid interconnected structure;

whereby the mobile vehicle hail cover protects the moving vehicle from falling hail, it does not cover any windows, headlights, tail lights, turn signal lights, brake lights, and mirrors, of the moving vehicle, to allow for the safe and legal driving operation of the vehicle while the mobile vehicle hail cover is installed.

* * * * *